July 24, 1923.
J. C. WILKIE
1,462,926
CONNECTING ROD AND PISTON ALIGNING MACHINE
Filed June 7, 1922
2 Sheets-Sheet 1
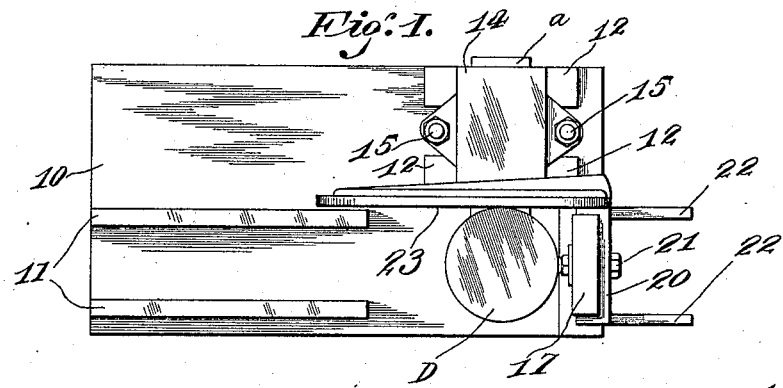
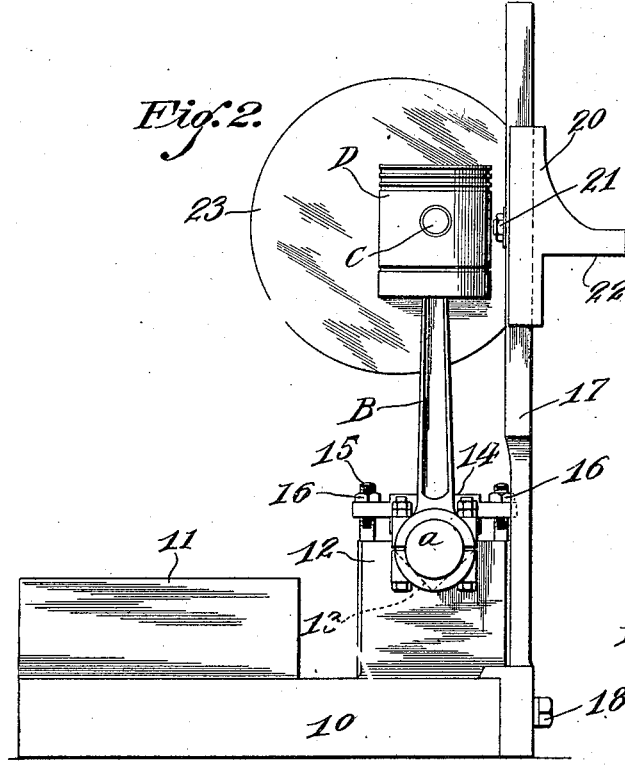
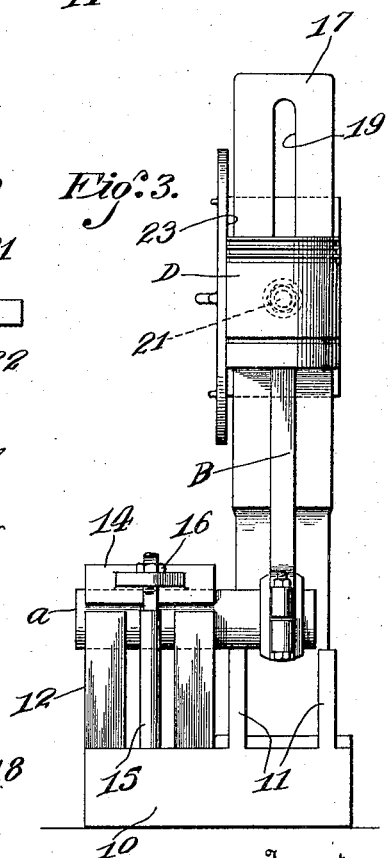
Inventor
Julius C. Wilkie
By Mason, Fenwick & Lawrence
Attorneys July 24, 1923.
J. C. WILKIE
1,462,926
CONNECTING ROD AND PISTON ALIGNING MACHINE
Filed June 7, 1922   2 Sheets-Sheet 2
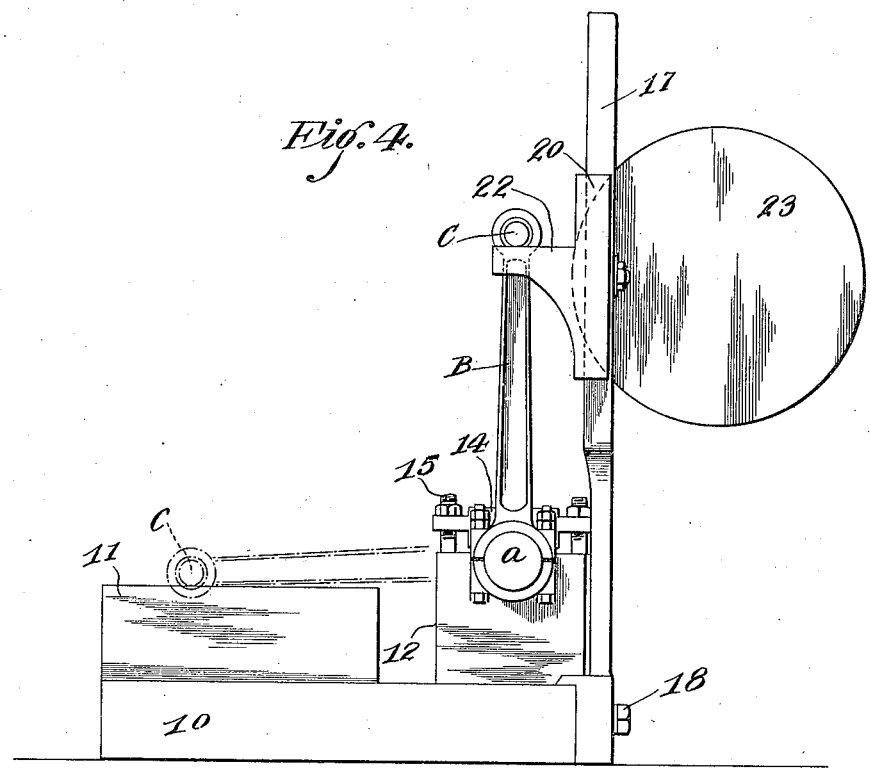
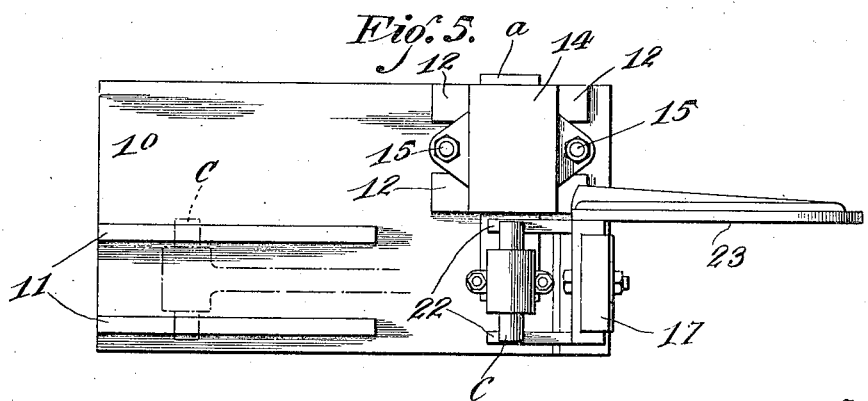
Inventor
Julius C. Wilkie
By Mason, Fenwick & Lawrence
Attorney Patented July 24, 1923.

1,462,926

UNITED STATES PATENT OFFICE.

JULIUS C. WILKIE, OF WINONA, MINNESOTA.

CONNECTING-ROD AND PISTON ALIGNING MACHINE.

Application filed June 7, 1922. Serial No. 566,652.

*To all whom it may concern:*

Be it known that I, JULIUS C. WILKIE, a citizen of the United States, residing at Winona, in the county of Winona and State of Minnesota, have invented certain new and useful Improvements in Connecting-Rod and Piston Aligning Machines; and I do hereby declare the following to be a full, clear, and exact description of the invention, such as will enable others skilled in the art to which it appertains to make and use the same.

This invention relates to aligning machines of the type used for testing for alignment of connecting rods and pistons of gas engines. The invention aims to provide a simple machine of this type which is equally adapted for testing connecting rods or pistons when attached to said rods. The machine includes an aligning element mounted on a standard, the element being adapted to be mounted on one side or the other of the standard depending upon whether the connecting rod or such rod with the piston attached is to be tested.

The above and other novel features of the invention will appear from the detailed description thereof taken in connection with the accompanying drawings, reference being had to the appended claims for the scope of the invention.

In the drawings,

Figure 1 is a plan view of the improved machine, the same being shown as arranged for testing a piston on the connecting rod;

Fig. 2 is a side elevation of the machine shown in Fig. 1, and

Fig. 3 is a front elevation of the machine.

Fig. 4 is a view similar to Fig. 2, showing the machine arranged for testing a connecting rod without the piston, and Fig. 5 is a plan view of Fig. 4.

In the drawings, 10 indicates a base on which is supported a pair of straight edges 11, these being in the form of parallel webs rising from said base. These straight edges lie in a common horizontal plane. 12 is a shaft saddle having the customary V-shaped seat 13 for the reception of a shaft which is indicated at A. The saddle is so constructed that the axis of the shaft is parallel to the plane of the straight edges 11. 14 is a clamping plate for securing the shaft A in the saddle; 15 are screw studs rising from said base through openings in the clamp plate, and 16 are the clamping nuts.

Extending upwardly from the base 10 is a post 17 preferably rectangular in cross section and preferably secured to the base 10 in any suitable manner as by a screw 18. The post is provided with a longitudinally extending slot 19.

Cooperating with the post 17 is a support or slide 20 adjustably secured on the post by any suitable means as a clamping bolt 21 passing through the slot 19. Extending from this support or slide at right angles to the post is a pair of straight edges 22 and projecting in an opposite direction from the support is a face plate 23 having its face disposed perpendicular to the axis of the shaft A in the saddle 12. In other words, the face of the face plate is at right angles to the plane lying in the straight edges 22.

The connecting rod to be tested is indicated at B. When it is desired to test the alignment of the bearings at either end of the connecting rod, the latter is mounted on the shaft A and a shaft C inserted in the upper bearing of the connecting rod. Testing for parallelism of the axes of the bearings at either end of the connecting rod is done in the following manner. Testing for parallelism in a vertical plane is accomplished by holding the connecting rod upright with the shaft C in place in the upper bearing and then bringing the straight edges 22 into contact with the under side of the shaft. If the axes of the shafts A and C are parallel the straight edges will of course make contact with the shaft on either side of the bearing. In testing for parallelism of said axes in a horizontal plane, the connecting rod is turned about the shaft A through an angle of approximately 90 degrees, as shown in dotted lines in Fig. 4. Here again, if the axes are parallel the straight edges 11 will engage the shaft C on either side of the bearing. Testing for alignment of the bearings may, therefore, be accomplished in a very expeditious manner.

Testing for alignment of the piston with the bearings at either end of the connecting rod is accomplished by changing the position of the slide or support 20 on the post 17, as clearly shown in Figs. 1, 2 and 3. When the axis of the piston is at right angles to the wrist pin bearings of the same which corresponds to the shaft C, the face plate and piston will make line contact as shown in Figure 3. Further testing of the piston may be had by turning the connecting rod on the shaft A until the piston rests on the inside edges of the straight edges 11. It will be understood that if the piston is properly aligned with the connecting rod that the piston will seat squarely between the edges of said straight edges 11. Lateral adjustment of the shaft A may be obtained by shifting the same in its saddle 12 as will be readily understood. If the diameters of the bearings to be tested are of different size, it is merely necessary to provide shafts of corresponding size.

It will now be seen that I have provided a simple and efficient machine for testing connecting rods and pistons. The machine is simple in construction and not liable to get out of order. By providing the slide with a face plate as well as straight edges the equivalent of two machines is obtained.

What I claim is:

1. In combination, a base, a pair of straight edges thereon, said straight edges being disposed in the same plane, a shaft saddle on the base, a post extending from said base adjacent said saddle perpendicularly to the plane of said straight edges, a slide adjustably mounted on said post, a pair of projecting straight edges carried by said slide, said projecting straight edges being in a plane parallel to the plane of the straight edges on the base.

2. The combination as in claim 1, and a face plate secured to said slide, the plane of said plate being perpendicular to the plane of the straight edges on the slide.

3. In combination, a base, a pair of straight edges thereon, said straight edges being disposed in the same plane, a post extending from said base perpendicularly to the plane of said straight edges, a support slidable on said post, a face plate secured to said support and having its face in a plane parallel to the post, a pair of straight edges projecting from said support and lying in a plane parallel to the plane of the straight edges on the base, and a shaft saddle on the base at one side of the foot of the post, the saddle being so constructed that the axis of the shaft to be received thereby shall be perpendicular to the plane of the face plate and parallel to the planes of the two sets of straight edges.

In testimony whereof I affix my signature.

JULIUS C. WILKIE.